United States Patent

[11] 3,559,797

| [72] | Inventor | Claude Brunois<br>Laugny-Les-Aubentons, Aisne, France |
|---|---|---|
| [21] | Appl. No. | 749,510 |
| [22] | Filed | Aug. 1, 1968 |
| [45] | Patented | Feb. 2, 1971 |
| [32] | Priority | Jan. 26, 1968 |
| [33] | | France |
| [31] | | 137,500 |

[54] MANURE TRANSPORT SYSTEM
2 Claims, 14 Drawing Figs.

| [52] | U.S. Cl. | 198/173 |
|---|---|---|
| [51] | Int. Cl. | B65g 19/04 |
| [50] | Field of Search | 198/173, 109(OX) |

[56] References Cited

UNITED STATES PATENTS

| 1,093,305 | 4/1914 | Anderson | 198/173X |
| 2,582,335 | 1/1952 | Johanning | 198/173 |
| 2,603,344 | 7/1952 | Cordis | 198/170(OX) |
| 2,828,851 | 4/1958 | Thomas | 198/173X |

FOREIGN PATENTS

| 1,436,328 | 3/1966 | France | 198/109 |

*Primary Examiner*—Edward A. Sroka
*Attorney*—William Anthony Drucker

ABSTRACT: The instant device comprises a manure conveyor of the chain and pusher type wherein the chain rides in a depression of the trough. A rotary guide pulley is used at the turning area wherein the pulley edge lies between the pusher and the conveyor chain.

PATENTED FEB 2 1971 3,559,797
SHEET 1 OF 5
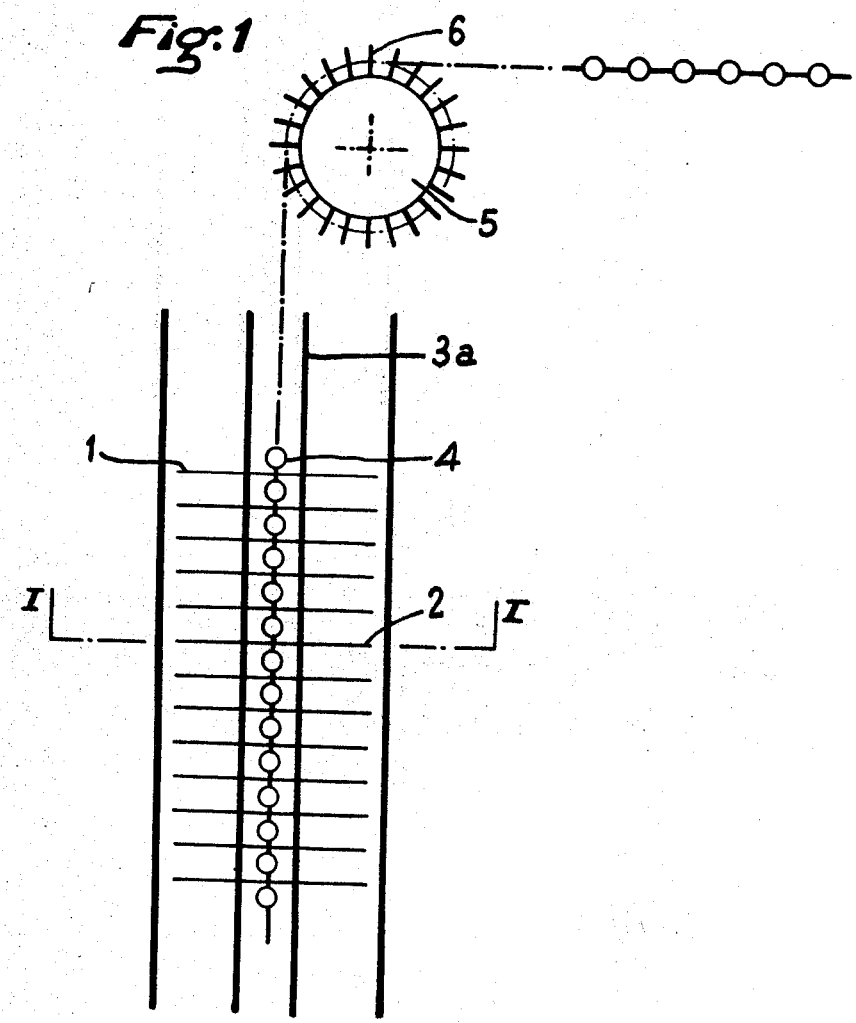
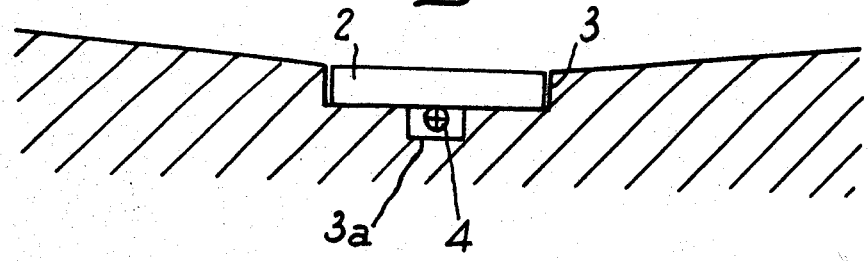

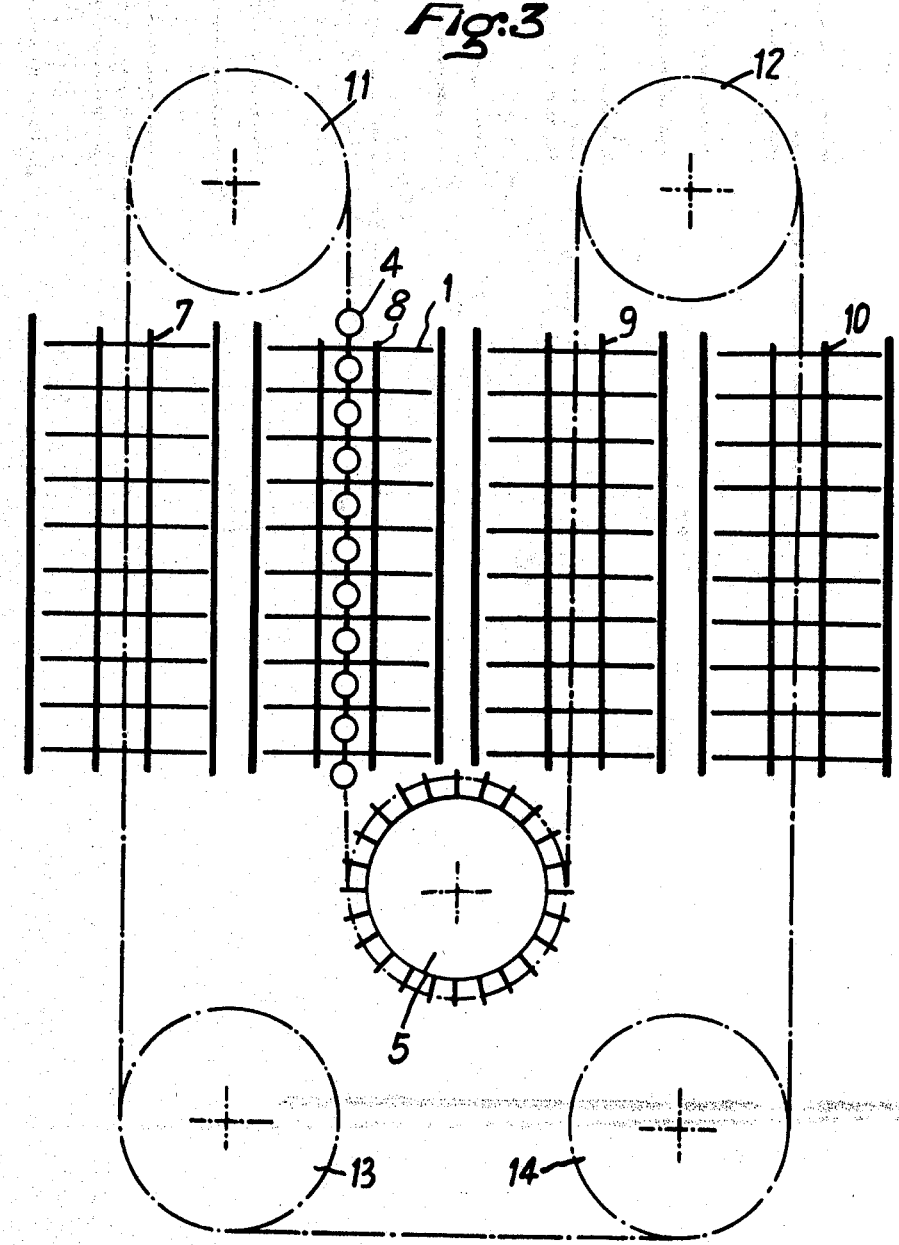

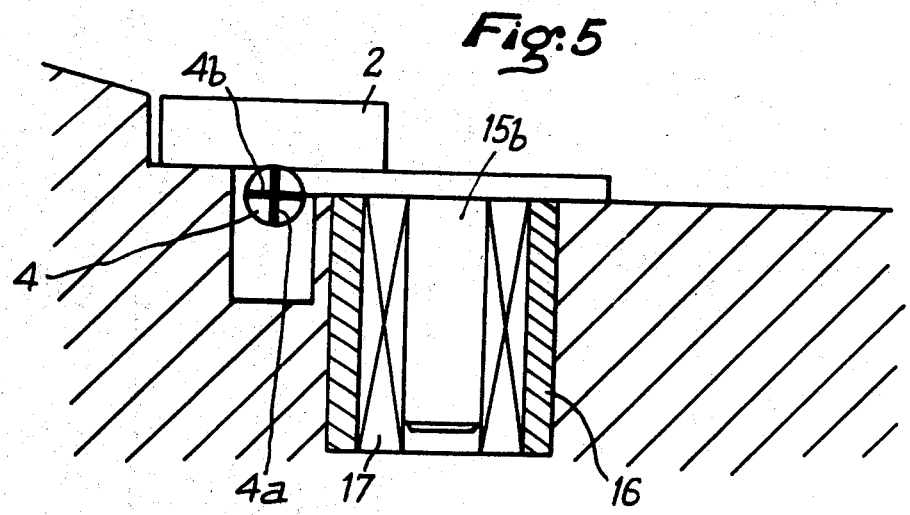
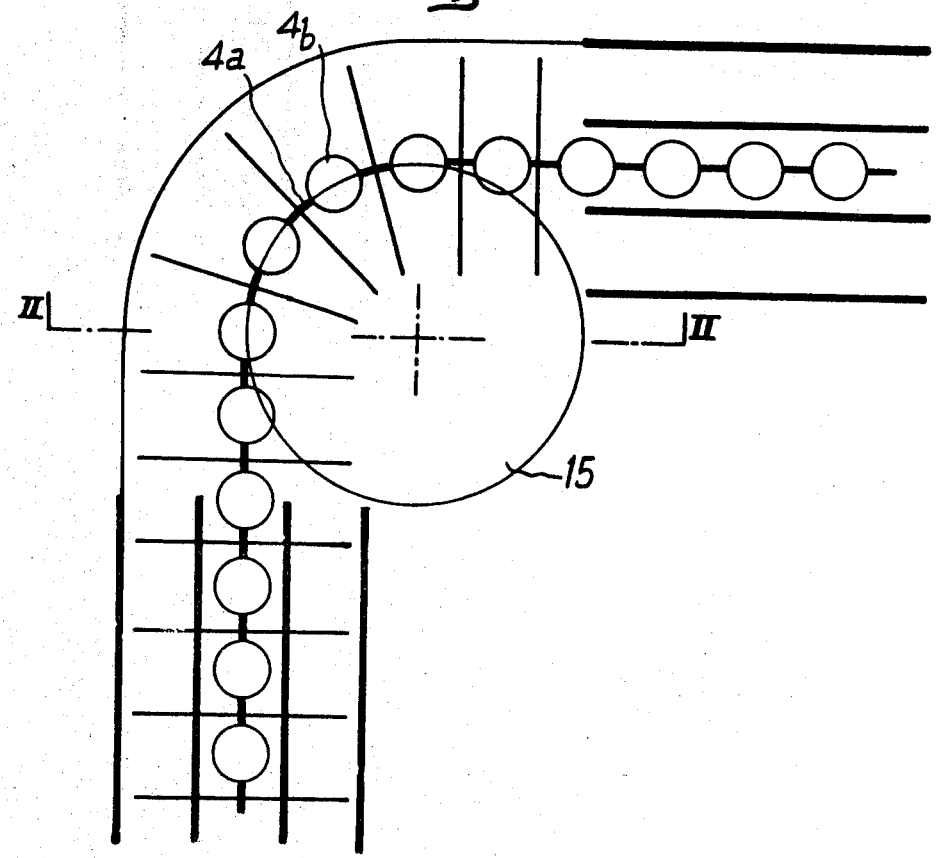

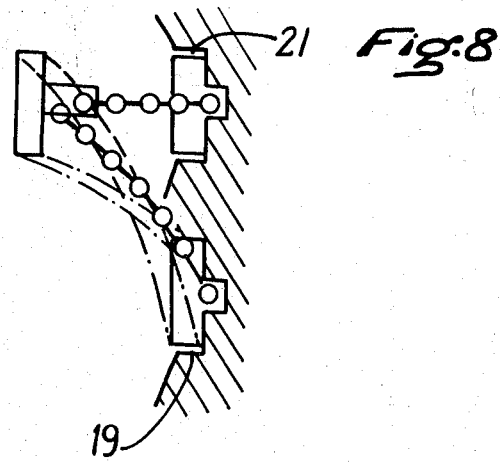
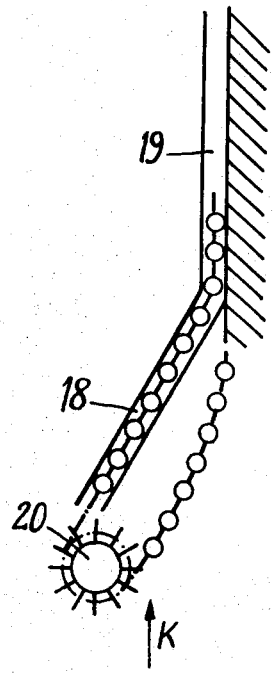
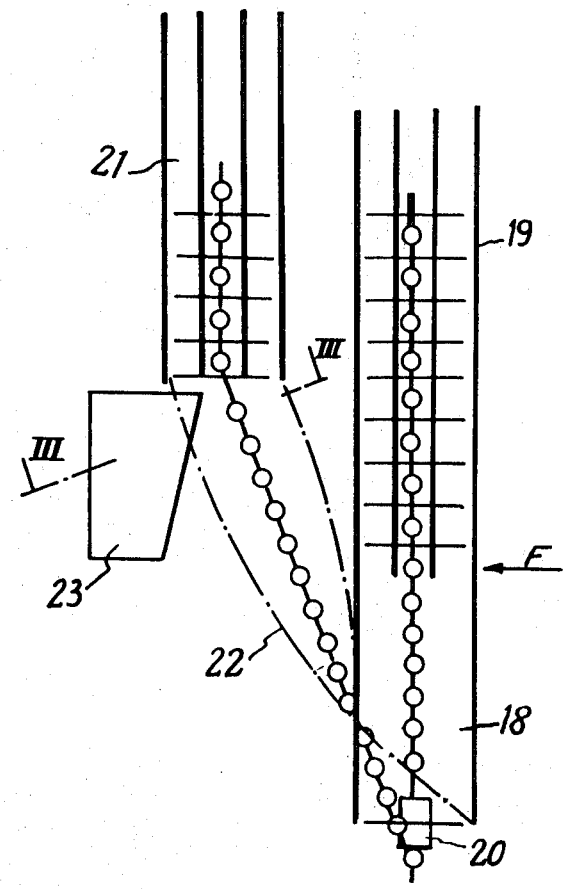

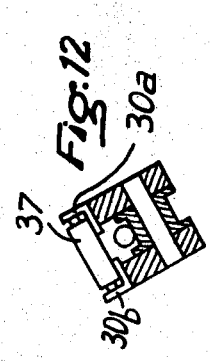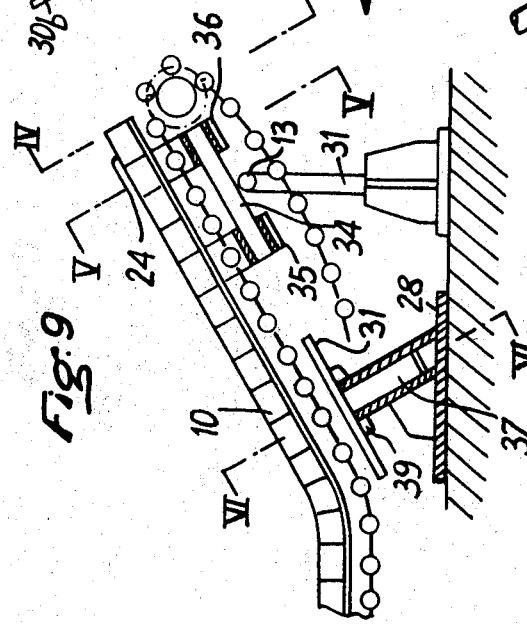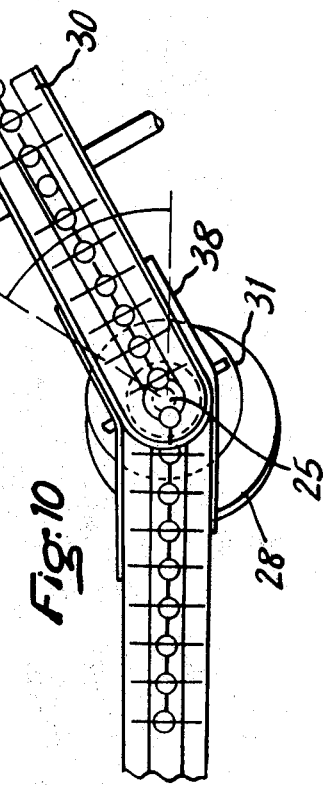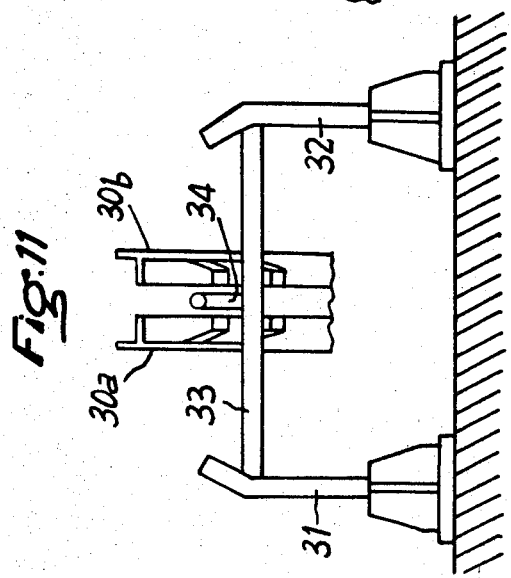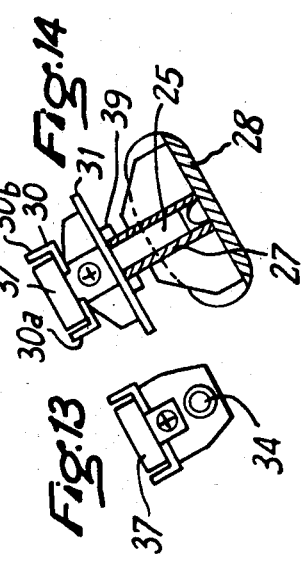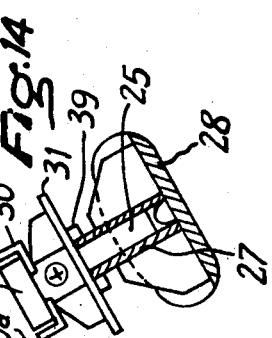

MANURE TRANSPORT SYSTEM

The invention relates to a manure transport system enabling stables to be cleaned and cleared.

This system is intended to convey manure to a heap where it is stocked temporarily, or to discharge it directly into a vehicle or the like for transport.

The system covered by the invention offers the advantage, by comparison with previous manure transport installations, of a far simpler and more economical and robust structure, also providing a greater variety of functional possibilities and, in particular, enabling the manure to be conveyed to any desired distance and in any desired direction from the stable exit.

Briefly, the installation according to the invention comprises: one or more channels, with one or more changes of direction of which at least one portion is situated in the floor of the stable, and each of which consists of a main cavity forming a first level, below the floor level and a secondary cavity, forming a second level below the main cavity, the secondary cavity being substantially situated in the center of the first level; a scraper chain accommodated in said secondary cavity, the scrapers sustaining the chain being affixed by their centers to said chain and capable of sliding in the main cavity, scraping the first level; and devices for driving said chain, and guide means for changing direction of the chain, said guide means being such that the chain may have slack and not exercise stretching forces on pivot points.

The invention will be understood more clearly from the following description.

In the attached drawing:

FIG. 1 is a plan view of a system in accordance with the invention;

FIG. 1a is a perspective view of direction changes of the channel;

FIG. 2 is a section along the line I–I of FIG. 1;

FIG. 2a is a perspective view of the driving chain with scraper;

FIG. 3 is a plan view of a system with multiple channels;

FIG. 4 is a plan view of the pulleys which enable the scraper chain of the system according to the invention to rotate and to change its direction;

FIG. 5 is a section along the line II–II of FIG. 4;

FIG. 6 is a plan view of part of the system, illustrating the reentry of the scraper chain into the return channel and the way in which scrapers are turned round by means of a ramp;

FIG. 6a is a perspective view of FIG. 6, more detailed;

FIG. 7 is a view in direction F of FIG. 6 showing the scraper chain in the highest position;

FIG. 8 is a view in direction K of FIG. 7;

FIG. 9 is a lateral view of an alternate version of the system illustrating the ascent of the scraper chains;

FIG. 10 is a plan view illustrating the free angular motion of an elevator of adjustable inclination;

FIG. 11 is a view in the direction G of the system shown in FIG. 9, illustrating a horizontal supporting bar on which the adjustable elevator moves;

FIGS. 12—14 are sectional diagrams of this elevator, along the lines IV–IV, V–V and VI–VI, respectively, of FIG. 9.

As may be seen from FIGS. 1 and 2, the system comprises scrapers, such as 1—2, sliding along the base of a central channel 3 provided in the floor of the stable, just behind the livestock, in the position where the manure collects. These scrapers are affixed by their center to an endless chain 4, which is of the log chain type.

The chain 4 moves in a groove 3a, which constitutes the lower level of the channel. This groove, positioned in the center of the channel, is of sufficient dimensions to enable the chain to move along it without rubbing, so that the chain undergoes practically no wear. The manure flows along the base of the groove 3a, which slants towards the outlet of the system. The chain 4 drives it and also acts as a grid, preventing manure from penetrating the groove 3a.

The chain 4 is drawn by a pulley 5, provided with notches 6 of a pitch corresponding to that of the links of the chain. A chain and a pulley of this kind are easily obtainable on the market and are of the type usually employed in the construction of block and tackle apparatus.

The pulley 5 is set in rotation, at the appropriate speed, by a motor speed reduction unit.

The system can obviously comprise a number of channels (7—10) FIG. 3, if required. In this case the chain will be guided by loose pulleys 11—14. These pulleys 11—14 are preferably mounted in the floor of the stable, as shown in FIGS. 4 and 5.

In FIG. 4 a loose pulley 15 is shown, for guiding the chain 4 during its passage from one channel to another in a system of the general type shown in FIG. 3.

In the sectional diagram of FIG. 5, it may be seen that this pulley comprises a disc 15 equipped with a shaft 15b mounted in a roller bearing 17. The latter is mounted in a fixed bushing 16 countersunk in the floor of the stable.

In FIG. 5 the chain has been symbolized by a circle containing a vertical stroke 4a, which symbolizes its vertical links, and a horizontal stroke 4b, which symbolizes its horizontal links; it can be seen that these latter come to rest against the lower surface of the disc 15, while the vertical links come to rest against the periphery of the disc 15a. This relative arrangement of the chain and of the disc 15a is also shown in FIG. 4, where the horizontal links are symbolized by circles 4b, while the vertical links are symbolized by strokes 4a. This arrangement prevents the chain from rising and gives free passage to the scrapers 2 (FIG. 5), without preventing the chain from applying weight on the scraper.

It is obvious that the system described above, and constructed entirely of standard elements available on the market, is extremely economical. Owing to the layout of the scraper chain the load which it has to support is uniformly distributed on each side of its longitudinal axis, so that the strain and wear are very moderate and traction is facilitated.

This arrangement also enables the scraper chain to stand up to changes in direction without difficulty, so that a number of channels and even a number of stables can be served by a single chain. The changes of direction of the chain are not confined to the horizontal plane. The fact is that if it is desired to store the manure in a heap extending above the level of the floor the scraper chain can then be raised to an appropriate height. In order to do this, a certain portion 18 of the channel (FIGS. 6 and 7) instead of being positioned in the floor of the stable, consists of an extension assembly of sheets and sections of a customary commercial type and forms an inclined plane which is connected to the portion 19 provided in the ground.

The driving pulley 20 is mounted at the top of this assembly, as is also the motor speed reduction unit: the floor area occupied by the system is thus reduced. When the scrapers arrive at the highest point of the installation and commence their return movement in the direction of the second channel 21 (FIG. 6) they are no longer guided by any channel part and turn over (as illustrated by the dot and dash lines 22 in FIG. 6).

To enable the chain to turn round in the required direction and return to channel 21, an inclined ramp or cam 23 has been provided on the ramp of the channel 21, at the inlet thereto (FIGS. 6 and 8).

In certain installations it is of advantage for the inclined elevator by which the manure is discharged onto a heap or into a vehicle to be made adjustable in direction, so that the point at which the manure falls onto the heap or into the vehicle can be modified according to the situation.

For this purpose the said inclined elevator 24 (FIGS. 9 and 10) provides a pivot shaft 25 and a supporting unit 26, these being arranged in such a manner that free angular adjustment of the direction of the elevator, by a few degrees, can be effected manually.

The pivot shaft 25 (FIGS. 9 and 14) pivots in a casing 27 mounted on a stand 28 affixed to the floor. The sheet metal channel 30 which constitute the elevator and which is connected to a channel part provided in the floor of the stable consists of two angles 30a — 30b and is rendered integral with the shaft 25 via a piece 31.

The supporting assembly 26 comprises two pillars 31—32 (FIG. 11) which rest on the floor and between which is mounted a horizontal bar 33. A shaft 34, which pivots in two bearings 35—36 affixed to the channel 34, moves over the said bar.

The scraper chain 37 passes between the angles 30a and 30b.

Sheaths or bellows units 38 of flexible material such as rubber, plastic or leather, affixed to the side of the elevator structure render the system of joints hermetic. After the elevator has been adjusted to the required direction, it is secured in position by means, for example, of a split ring 39 (FIGS. 9 and 14).

I claim:

1. A manure transport system comprising a plurality of manure channels or collectors of which one horizontal portion is provided in the floor of a stable, said channel portions each having parallel walls and being provided, along the axis thereof, of a central secondary cavity; said system comprising: a plurality of scraper elements adapted for running within the channels and bearing on the bottom thereof to convey the manure towards the stable exit, said scraper elements each having a length substantially equaling the width of a channel; a drive chain accommodated under the scraper elements and adapted for free translation in the secondary cavity, the said chain being affixed substantially at the center of the scraper elements, the said chain being of the log chain type comprising pairs of mutually perpendicular links and adapted for changes in direction both in the horizontal and in the vertical planes so that a number of channels can be served by a single chain; and guiding means cooperating with the said chain, said guiding means comprising at least one guide pulley adapted for enabling the drive chain to be oriented in the horizontal plane in order to pass from one of the said channel portions to another, a step bearing having a support countersunk in the floor of the stable, the said guide pulley being mounted on said step bearing and having a flange within the secondary cavity said flange being accommodated between the scraper and the horizontal links in the region of the upper right angle formed by the two perpendicular links of the pair, whereby the chain is prevented from rising without, however being prevented from slackening and sliding with respect to the guiding means.

2. A manure transport system as claimed in claim 1, comprising a supplementary channel portion forming a manure elevator and connected to one of the said horizontal channel portions, the said supplementary portion consisting of an inclined framework supporting the driving elements of the drive chain, said driving elements including a toothed wheel supported at the top of the said framework and motor means for driving said toothed wheel, a further horizontal return channel portion parallel to the said horizontal channel portion, the drive chain having a free run in the air from the toothed wheel to the inlet of the return channel portion, cam means located at the said inlet for turning over the chain and the scrapers secured thereto by 180°, the said cam means having an inclined surface portion which is adapted to cause gradual reversal of the scrapers position and a corresponding turning over of the chain.